United States Patent
Sugiyama

(10) Patent No.: US 8,990,296 B2
(45) Date of Patent: Mar. 24, 2015

(54) SERVER CHECK SYSTEM AND SERVER CHECK APPARATUS

(71) Applicant: DeNA Co., Ltd., Tokyo (JP)

(72) Inventor: Toshiharu Sugiyama, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 14/157,591

(22) Filed: Jan. 17, 2014

(65) Prior Publication Data

US 2014/0358993 A1 Dec. 4, 2014

(30) Foreign Application Priority Data

Jun. 3, 2013 (JP) ................................. 2013-117004

(51) Int. Cl.
*G06F 15/16* (2006.01)
*H04L 29/08* (2006.01)
*G06F 17/30* (2006.01)
*G06Q 10/08* (2012.01)

(52) U.S. Cl.
CPC .......... H04L 67/10 (2013.01); G06F 17/30489 (2013.01); G06Q 10/087 (2013.01); G06F 17/3089 (2013.01)
USPC ...................... 709/203; 705/1; 705/7; 705/31

(58) Field of Classification Search
CPC .......... G06F 17/3089; G06F 17/30489; G06Q 10/087; G06Q 30/0202; G06Q 40/00; G06Q 40/02; H04L 67/1002
USPC .............................. 709/203, 224; 705/1, 7, 31
See application file for complete search history.

(56) References Cited

U.S. PATENT DOCUMENTS

| | | | |
|---|---|---|---|
| 6,237,035 B1* | 5/2001 | Himmel et al. | 709/224 |
| 2003/0212573 A1* | 11/2003 | Dorrance et al. | 705/1 |
| 2004/0078423 A1* | 4/2004 | Satyavolu et al. | 709/203 |
| 2010/0042675 A1* | 2/2010 | Fujii | 709/203 |
| 2013/0297381 A1* | 11/2013 | Akkihal et al. | 705/7.31 |

FOREIGN PATENT DOCUMENTS

JP 3896486 3/2007

\* cited by examiner

*Primary Examiner* — Dustin Nguyen
(74) *Attorney, Agent, or Firm* — IPUSA, PLLC

(57) ABSTRACT

A server check system that checks a duplicated process of a server that performs a predetermined process in response to a request from a terminal device, includes a receiving unit that receives a request sent from the terminal device to the server when starting a checking; a sending unit that generates a predetermined number of requests by copying the request and sends the predetermined number of requests to the server at the same time; and a determining unit that obtains a processed result by the server based on the predetermined number of requests and determines whether a duplicated process occurs.

7 Claims, 10 Drawing Sheets

FIG.6

| PLAYER INFORMATION | | | | | | |
|---|---|---|---|---|---|---|
| PLAYER ID | ICON DATA | PLAYER NAME | LEVEL | STATUS | ITEM PROVIDING CONDITION | ITEM AMOUNT FOR EACH ITEM |
| | | | | | | ... |

SERVER CHECK SYSTEM AND SERVER CHECK APPARATUS

BACKGROUND OF THE INVENTION

1. Field of the Invention

The present invention relates to a technique of checking a bug of a server function for a social game or the like.

2. Description of the Related Art

In services or the like using INTERNET, there is a case that a process in a server is duplicated when a plurality of requests are sent from a user terminal to the server at the same time or within a short period. For example, when a player sends item obtaining requests to a social game control server almost at the same time in a social game, an item providing process is duplicated in the server so that two items, although only one item should be given to the player, may be provided to the player.

Such a bug is a disadvantage for a game provider and also causes an unbalance in providing items in the game. Thus, it is necessary to find and fix such a bug before releasing a service.

Patent Document 1 discloses a check apparatus for websites for analyzing vulnerability of websites.

However, the check apparatus disclosed in Patent Document 1 only tests vulnerability of websites from the point of view of security such as a leak of personal information or the like. Thus, the technique disclosed in Patent Document 1 cannot be applied for checking a duplicated process that occurs when a plurality of requests are sent from a user terminal to the server at the same time or within a short period.

Patent Document

[Patent Document 1] Japanese Patent No. 3,896,486

SUMMARY OF THE INVENTION

The present invention is made in light of the above problems, and provides a technique for effectively checking a duplicated process that occurs when a plurality of requests are sent from a user terminal to the server at the same time or within a short period.

According to an embodiment, there is provided a server check system that checks a duplicated process of a server that performs a predetermined process in response to a request from a terminal device, including: a receiving unit that receives a request sent from the terminal device to the server when starting a checking; a sending unit that generates a predetermined number of requests by copying the request and sends the predetermined number of requests to the server at the same time; and a determining unit that obtains a processed result by the server based on the predetermined number of requests and determines whether a duplicated process occurs.

Note that also arbitrary combinations of the above-described elements, and any changes of expressions in the present invention, made among methods, devices, systems, recording media, computer programs and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

FIG. 6 is a view illustrating an example of a data structure of player information;

DETAILED DESCRIPTION OF THE PREFERRED EMBODIMENTS

Figure 1:
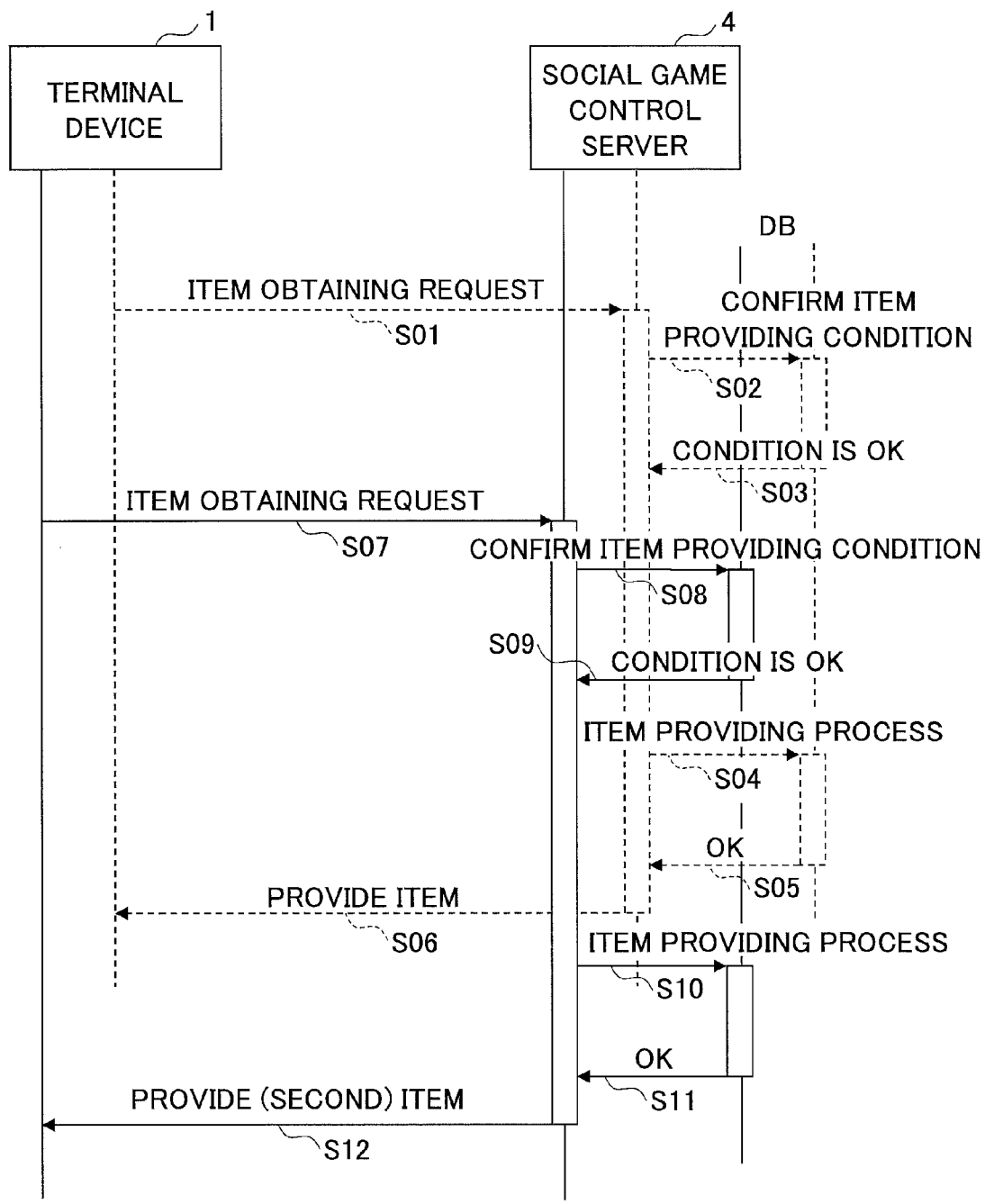
FIG. 1 is a sequence diagram for explaining a problem that may occur in an item providing process in a social game.

Before describing the present invention, a problem that may occur in an item providing process in a social game is explained. FIG. 1 is a sequence diagram for explaining such a problem.

In FIG. 1, when an item obtaining request is sent from a terminal device 1 to a social game control server 4 (step S01), the social game control server 4 determines whether an item providing condition is satisfied by referring to a database (DB) (step S02). Then, when the condition is satisfied (step S03), the social game control server 4 performs an item providing process (step S04, S05) and provides an item to the terminal device 1 (step S06).

If another item obtaining request is sent from the terminal device 1 to the social game control server 4 before the item providing process is performed (step S07), similar to the previous process, the social game control server 4 determines whether the item providing condition is satisfied by referring to the DB (step S08). As the item providing process (step S04, S05) for the previous item obtaining request is not performed yet at this time, the social game control server 4 determines that the item providing condition is satisfied (step S09). Thus, the social game control server 4 performs another item providing process (step S10, S11), and provides a second item to the terminal device 1 (step S12).

For a method to check the phenomenon as described above that the items are provided twice, it may be considered to prepare a plurality of terminal devices, send item obtaining requests from the terminal devices to the social game control server at the same time and confirm an item providing state.

However, by this method, other factors such as differences in sending timing of the item obtaining requests between the terminal devices, an influence of a communication speed or the like may cause a duplicated process so that reliability is low.

The invention will now be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

(Structure)

Figure 2:
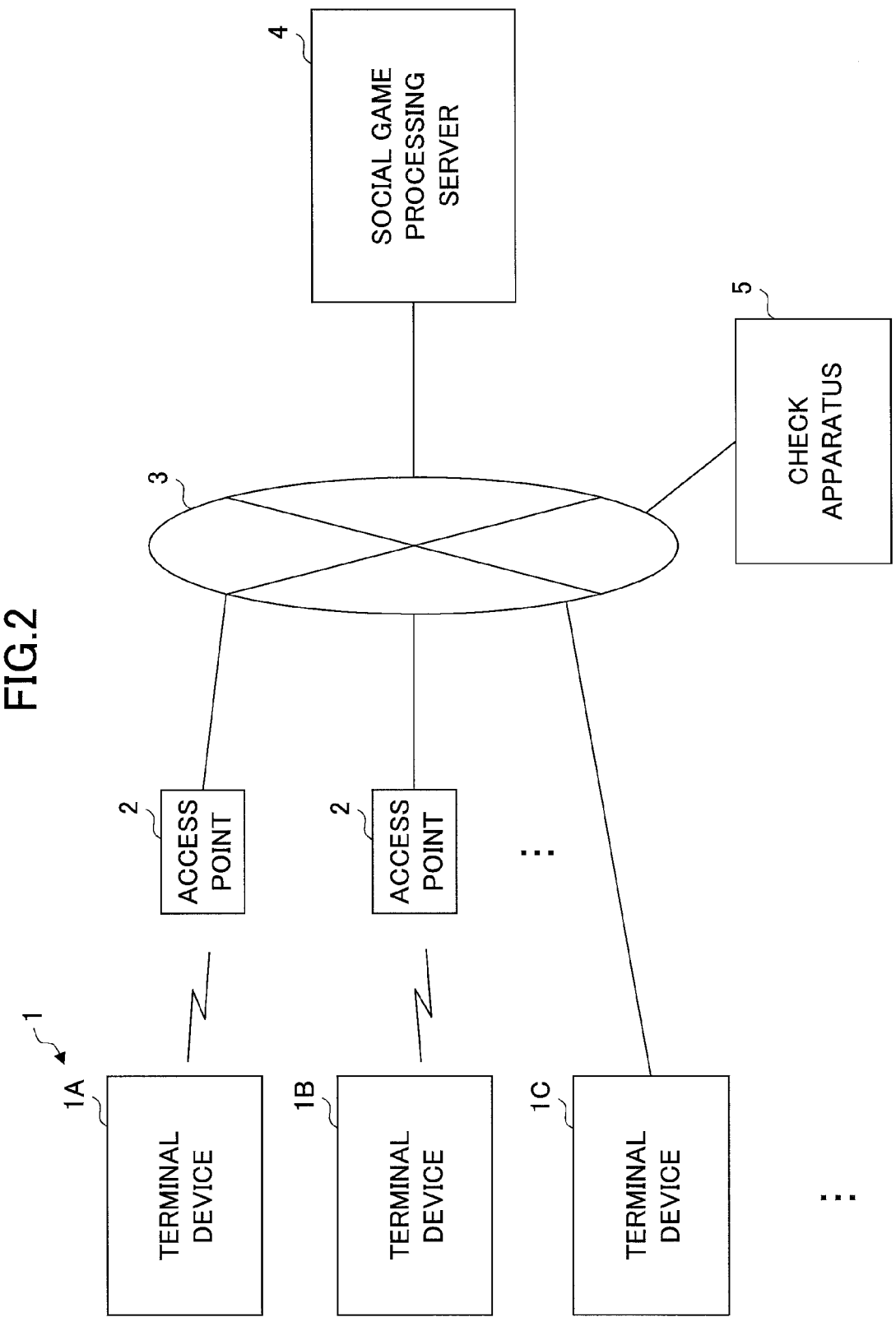
FIG. 2 is a view illustrating an example of a system structure of an embodiment.

FIG. 2 is a view illustrating an example of a system structure of an embodiment.

In FIG. 2, the system includes terminal devices 1 (1A to 1C) such as a smartphone, a mobile phone, a personal computer (PC) or the like, smartphones), access points 2 such as a mobile station, a Wi-Fi station or the like, a network 3 such as INTERNET or the like, a social game control server 4 that manages (controls) a game in which a plurality of players play a game via the network, and a check apparatus 5 (a server check system or a server check apparatus) that tests the social game control server 4.

In this embodiment, for example, it is assumed that the terminal devices 1A and 1B are smartphones and the terminal device 10 is a PC.

Further, it is assumed that a player plays a game provided by the social game control server 4 via the terminal device 1A. While the game is played by the player, it is assumed that an operator operates the check apparatus 5 via the terminal device 1B or the terminal device 1C to perform a check process. However, before actual services by the social game control server 4 are started, the terminal devices 1A may also be operated by the operator. Then, the terminal device 1A may be operated by an ordinary player after the actual services by the social game control server 4 are started.

In this embodiment, data that is sent and received between the terminal device 1A and the social game control server 4 passes through the check apparatus 5 by setting the address of the check apparatus 5 as an address of a proxy setting in the terminal device 1A. The check apparatus 5 may be physically provided at any place as long as it is connected to the network. The check apparatus 5 may be provided in any of the terminal devices 1A to 1C or may be provided in the social game control server 4.

Figure 3:
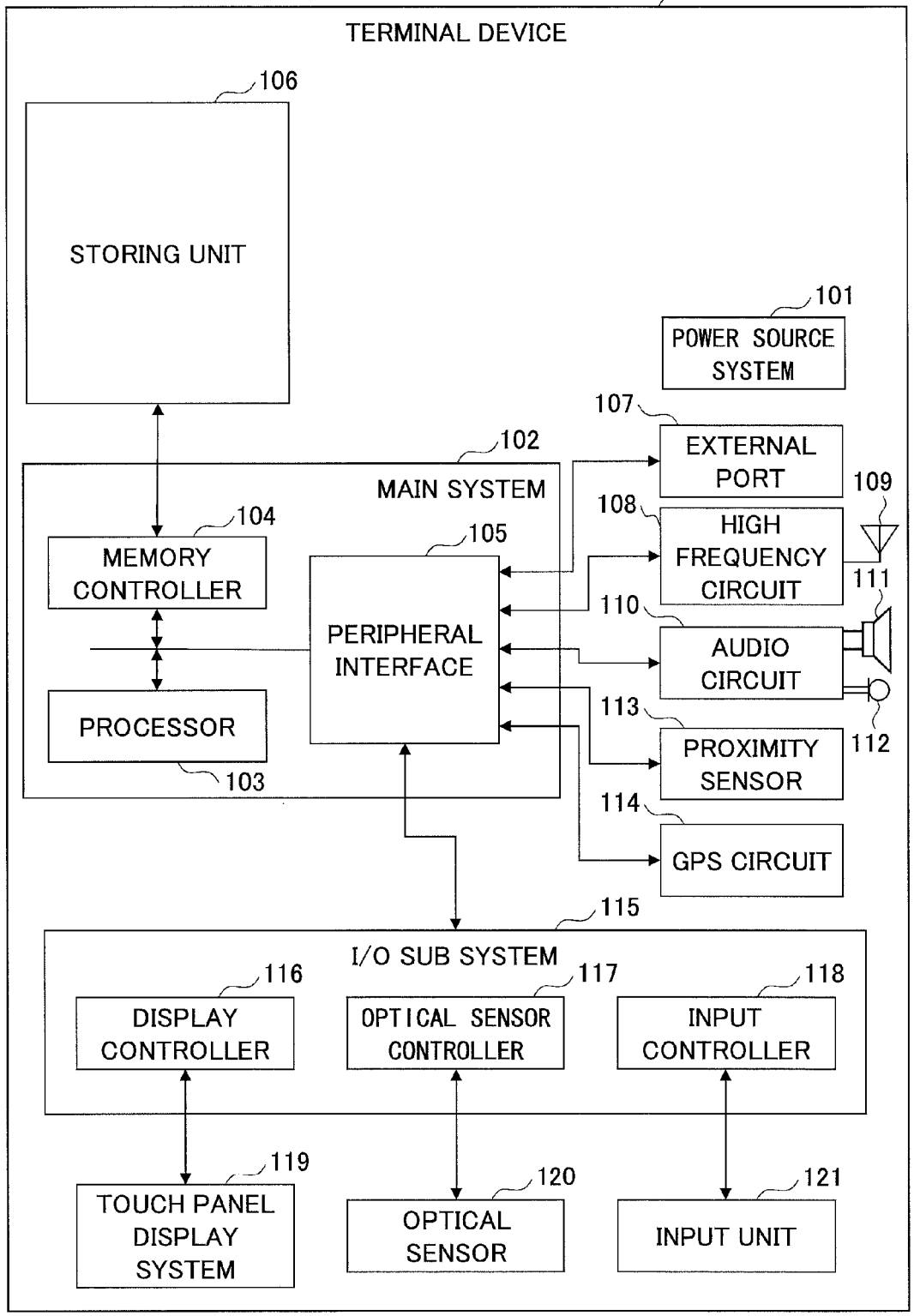
FIG. 3 is a view illustrating an example of a hardware structure of a terminal device.

FIG. 3 is a view illustrating an example of a hardware structure of the terminal device 1A or 1B that are assumed as a smartphone.

In FIG. 3, the terminal device 1A or 1B includes a power source system 101, a main system 102 including a processor 103, a memory controller 104 and a peripheral interface 105, a storing unit 106, an external port 107, a high frequency circuit 108, an antenna 109, an audio circuit 110, a speaker 111, a microphone 112, a proximity sensor 113, a GPS (Global Positioning System) circuit 114, an I/O (Input/Output) sub system 115 including a display controller 116, an optical sensor controller 117 and an input controller 118, a touch panel display system 119, an optical sensor 120 and an input unit 121.

Figure 4:
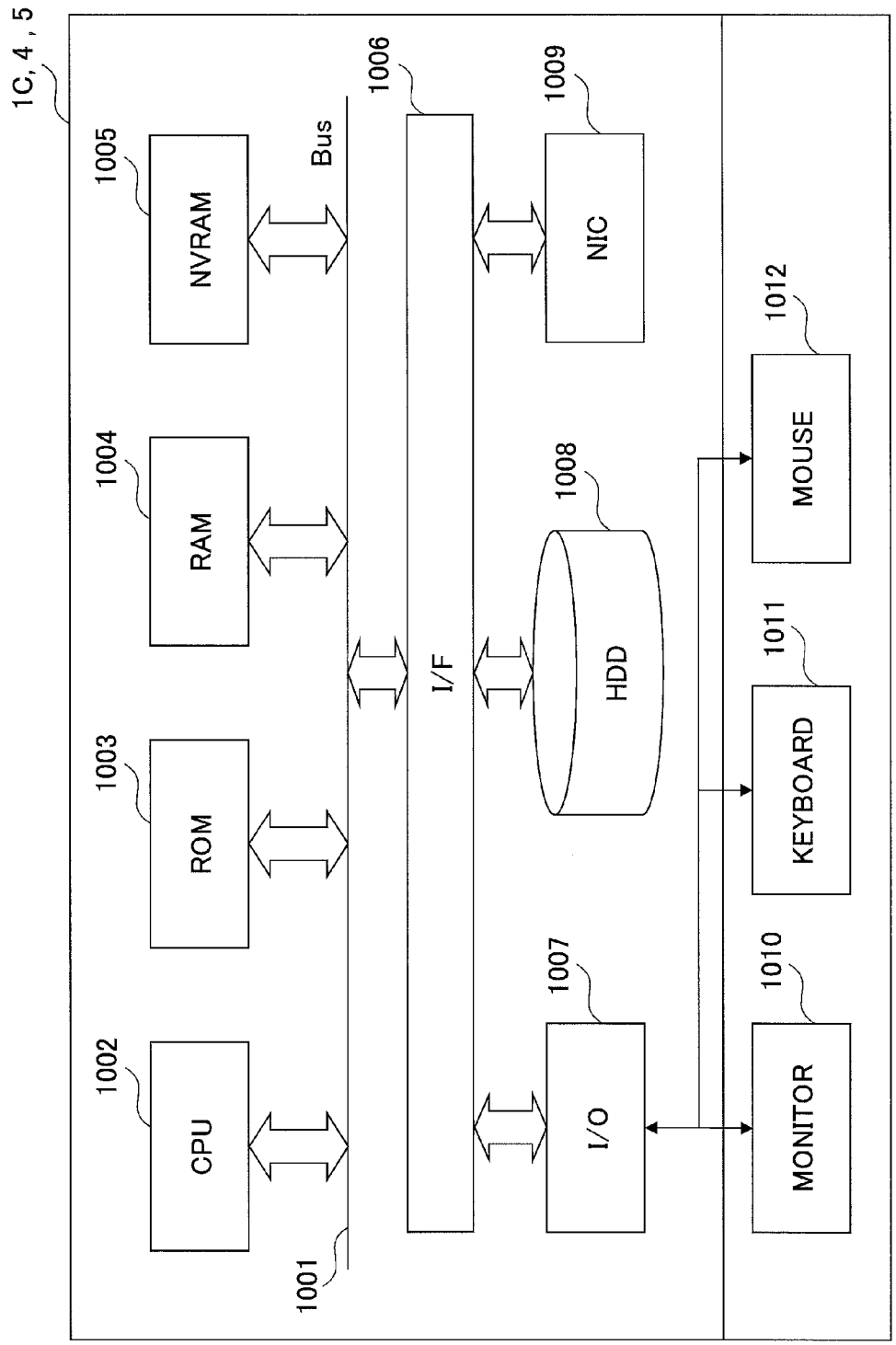
FIG. 4 is a view illustrating an example of a hardware structure of a social game control server.

FIG. 4 is a view illustrating an example of a hardware structure of the terminal device 1C, the social game control server 4 or the check apparatus 5 that are assumed as a PC.

In FIG. 4, the terminal device 1C, the social game control server 4 or the check apparatus 5 includes a CPU (Central Processing Unit) 1002, a ROM (Read Only Memory) 1003, a RAM (Random Access Memory) 1004, an NVRAM (Non-Volatile Random Access Memory) 1005 and an I/F (Interface) 1006 connected to a system bus 1001, an I/O (Input/Output Device) 1007 for a keyboard, a mouse, a monitor, a CD/DVD (Compact Disk/Digital Versatile Disk) drive or the like, an HDD (Hard Disk Drive) 1008, an NIC (Network Interface Card) 1009, a monitor 1010, a keyboard 1011, a mouse 1012 connected to the I/F 1006, and the like.

Figure 5:
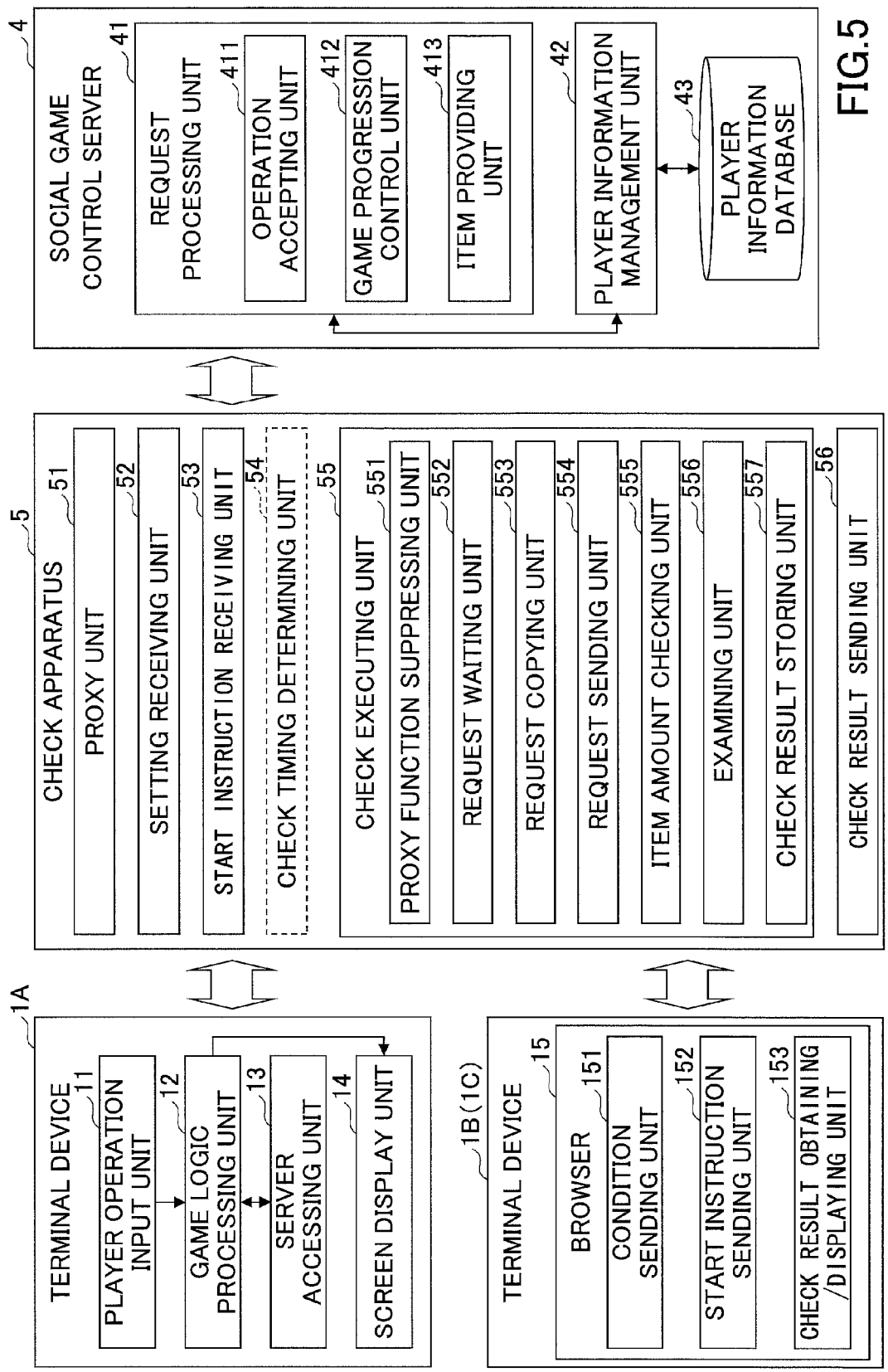
FIG. 5 is a view illustrating an example of a functional structure of the terminal device, the social game control server and a check apparatus.

FIG. 5 is a block diagram illustrating an example of a functional structure of the terminal devices (1A and 1B (or 1C)), the social game control server 4 and the check apparatus 5.

The terminal device 1A includes a player operation input unit 11, a game logic processing unit 12, a server accessing unit 13 and a screen display unit 14.

The player operation input unit 11 has a function to input (accept) an operation of a player (an operator) that operates the terminal device 1A.

The game logic processing unit 12 has a function to advance a game by transitioning screens in accordance with an input operation of the player input by the player operation input unit 11. There are cases for the game logic processing unit 12 in which the game logic is processed based on page data described in a Hyper Text Markup Language (HTML) or the like and scripts or the like included in the page data sent from the game control server apparatus 4 (browser type), and in which the game logic is processed based on an application which is previously downloaded and installed in the terminal device 1A (application type).

The server accessing unit 13 has a function to send a request to the social game control server 4 and receive a processed result or the like as a response from the game control server 4 when it is necessary to access the social game control server 4 in a course of the processing by the game logic processing unit 12. Here, the request includes a request of updating and a request of referring to data. The request of updating is to update player information or the like. The request of referring to data is to refer to the player information or the like.

The screen display unit 14 has a function to display screens under control of the game logic processing unit 12.

The social game control server 4 includes a request processing unit 41, a player information management unit 42 and a player information database 43. The request processing unit 41 includes an operation accepting unit 411, a game progression control unit 412 and an item providing unit 413.

The request processing unit 41 has a function to receive a request from the terminal device 1A, perform a corresponding process and send a processed result of the request to the terminal device 1A as a response. When the request processing unit 41 receives the request of updating, the request processing unit 41 performs an operation to update the player information or the like, and sends the updated player information or the like that is changed by the operation as the processed result. When the request processing unit 41 receives the request of referring to data, the request processing unit 41 refers to and obtains the corresponding player information or the like, and sends the obtained player information or the like as the processed result. Here, the response by the request processing unit 41 may include screen information which is to be operated by the player next, for the browser type.

The operation accepting unit 411 is a function unit that is mainly used for the browser type, and has a function to accept a predetermined operation input from the terminal device 1A. For the application type, the game logic processing unit 12 of the terminal device 1A has a function corresponding to the operation accepting unit 411.

The game progression control unit 412 is a function unit mainly used for the browser type. The game progression control unit 412 has a function to control game progression. For the application type, the game logic processing unit 12 of the terminal device 1A has a function corresponding to the game progression control unit 412.

The item providing unit 413 has a function to provide an item to the player of the terminal device 1A in response to a request of obtaining the item from the terminal device 1A when the player of the terminal device 1A becomes capable of obtaining the item in a course of the game progression (when the item is given to the player from a friend player of the player, or the like, for example). The item is provided to the player by recording a fact that the item is provided in the respective player information of the player information database 43 by the player information management unit 42 and sending data indicating that the item is provided to the terminal device 1A.

The player information management unit 42 has a function to store various information (player information) of all of the players participating in the game in the player information database 43 and manage the information. The player information management unit 43 refers to or updates the player information in response to a request from the request processing unit 41.

The check apparatus 5 includes a proxy unit 51, a setting receiving unit 52, a start instruction receiving unit 53, a check timing determining unit 54, a check executing unit 55 and a check result sending unit 56.

The check executing unit 55 includes a proxy function suppressing unit 551, a request waiting unit 552, a request copying unit 553, a request sending unit 554, an item amount checking unit 555, an examining unit 556 and a check result storing unit 557. For example, a receiving unit may be actualized by the request waiting unit 552, a sending unit may be actualized by the request copying unit 553 and the request sending unit 554, and a determining unit may be actualized by the item amount checking unit 555 and the examining unit 556.

The proxy unit 51 has a function to provide a proxy function to the terminal device 1A for accessing the social game control server 4. This means that when a request from the terminal device 1A to the social game control server 4 is sent, the request is once received by the check apparatus 5 and then transferred to the social game control server 4 from the check apparatus 5. Similarly, a response from the social game control server 4 is once received by the check apparatus 5 and then transferred to the terminal device 1A from the check apparatus 5.

The setting receiving unit 52 has a function to receive a setting of a check condition in response to an operation from the terminal device 1B (or 1C), that functions as the console of the check apparatus 5. The check condition includes a request copying number, check times and a check interval.

The request copying number indicates the number of requests to make based on a request sent from the terminal device 1A. For example, when the request copying number=10, nine copies are made to generate ten requests.

The check times indicate the number of times a process of sending the requests of the request copying number at the same time is performed. The duplicated process is checked for each process of sending the requests of the request copying number at the same time. The check interval indicates an interval between the processes.

Default values for the check condition may be set. By setting the default values for the check condition, the default values can be used as the check condition when the operator does not set values for the check condition.

The start instruction receiving unit 53 has a function to receive an instruction to start a checking in response to an operation from the terminal device 1B (or 1C).

The check timing determining unit 54 has a function to automatically determine timing to start the checking when a predetermined condition is satisfied, regardless of the instruction to start the checking received by the start instruction receiving unit 53. The check timing determining unit 54 monitors data sent from the social game control server 4 to the terminal device 1A and determines timing to start the checking when the predetermined condition is satisfied. The predetermined condition is, for example, when a predetermined page by which an item is capable of being provided is included, when a predetermined message notifying that an item is to be provided is included in a page, or predetermined data that indicates providing an item is included.

The check executing unit 55 has a function to execute the checking after being instructed to start the checking.

The proxy function suppressing unit 551 has a function to suppress a part of the proxy function of the proxy unit 51 after starting the checking, and remove the suppression after the checking is completed. This means that although the check apparatus 5 immediately transfers a request sent from the terminal device 1A to the social game control server 4 by a normal proxy function, after starting the checking, the check apparatus 5 only receives the request from the terminal device 1A and does not transfer the request until the request is copied for a predetermined number to be sent at the same time. Further, although the check apparatus 5 immediately transfers a response sent from the social game control server 4 to the terminal device 1A by the normal proxy function, after starting the checking, the check apparatus 5 shuts responses other than a response corresponding to an original request from the social game control server 4. In other words, the check apparatus 5 shuts responses corresponding to the requests increased by copying the original request, after starting the checking.

The request waiting unit 552 has a function to wait for receiving a request from the terminal device 1A and receives the request when it is sent, after starting the checking.

The request copying unit 553 has a function to copy the request from the terminal device 1A received by the request waiting unit 552 and generate a request that satisfies the request copying number and the check times of the check condition.

The request sending unit 554 has a function to send the copied requests, that are generated by the request copying unit 553, to the social game control server 4 at the same time for each of the check times.

The item amount checking unit 555 has a function to confirm an increased amount of the item of the player by the plurality of requests in each of the check times in the social game control server 4 to determine whether a duplicated process occurs. The item amount checking unit 555 determines that a duplicated process is performed when two or more items are provided in response to a request by which only one item should be provided. Similarly, the item amount checking unit 555 determines that a duplicated process is performed when the number of items that exceeds the number of items that should be provided by the request.

For a method of confirming the increased amount of the item, specifically, the item amount checking unit 555 may obtain the increased amount of the item from page data or other data of a response from the social game control server 4, when information regarding the amount of the item (including a sentence such as "item is provided" or the like, in addition to a numeral value) is included in the response. The increased amount of the item may be obtained from a difference between page data or other data of before and after the request. When the response to the request indicates an error, the item amount checking unit 555 may determine that a duplicated process does not occur for the response.

When the response from the social game control server 4 does not include the information regarding the amount of the item, the item amount checking unit 555 accesses to the social game control server 4 and obtains the amount of the item of the player. For example, the item amount checking unit 555 may obtain the amount of the item by accessing an obtained item list of the player. For this case, address (path) or the like to access the list may be previously stored in the check apparatus 5. Alternatively, the check apparatus 5 may require settings of data such as player ID, passwords or the like for accessing the social game control server 4.

The examining unit 556 has a function to examine the social game control server 4 based on the checked result of the duplicated process by the item amount checking unit 555, the check condition or the like. The examination may be performed by previously corresponding examined results and checked results of the duplicated process, check conditions or the like in a table or the like, and obtaining an examined result based on the obtained checked result of the duplicated process, the check condition or the like.

The check result storing unit 557 has a function to internally store a check result such as whether a duplicated process occurs for each of the check times, logs of the actually sent requests and responses, an examined result by the examining unit 556 or the like.

The check result sending unit 56 has a function to send the check result to the terminal device 1B (or 1C), in response to an operation from the terminal device 1B (or 1C).

The terminal device 1B (or 1C) includes a check condition sending unit 151, a start instruction sending unit 152 and a check result obtaining/displaying unit 153 that are actualized by a function of a browser 15.

The check condition sending unit 151 has a function to set the check condition for the check apparatus 5 based on an operation of the operator.

The start instruction sending unit 152 has a function to send the instruction to start the checking to the check apparatus 5 based on an operation of the operator.

The check result obtaining/displaying unit 153 has a function to obtain the check result from the check apparatus 5 and display it based on an operation of the operator.

Here, although an example in which the main functions of the terminal device 1B (or 1C) are actualized by the browser 15 is explained, alternatively, a specific application for controlling the check apparatus 5 may be used.

Further, although an example in which the terminal device 1A is used for advancing the game is explained, alternatively, the terminal device 1C, that is a PC or the like, may be used for advancing the game by emulating a game screen of a smartphone or the like without using the terminal device 1A.

FIG. 6 is a view illustrating an example of a data structure of the player information stored in the player information database 43 (FIG. 5).

The player information database 43 includes items such as "player ID", "icon data", "player name", "level", "status", "item providing condition", "item amount for each item", or the like.

The "player ID" is data to specify (identify) the player. The "icon data" is data indicating a display icon of the player. The "player name" is data for a display name of the player. The "level" is data indicating strength in the game of the player. The "status" is data indicating a game progression degree of the player.

The "item providing condition" is data indicating a condition by which an item is provided to the user. For example, a condition is to send a predetermined request when a predetermined item is gifted to the player by a friend player of the player. The "item amount for each item" is data indicating the amount (the number) of each of the items that is currently provided to the player.

(Operation)

Figure 7:
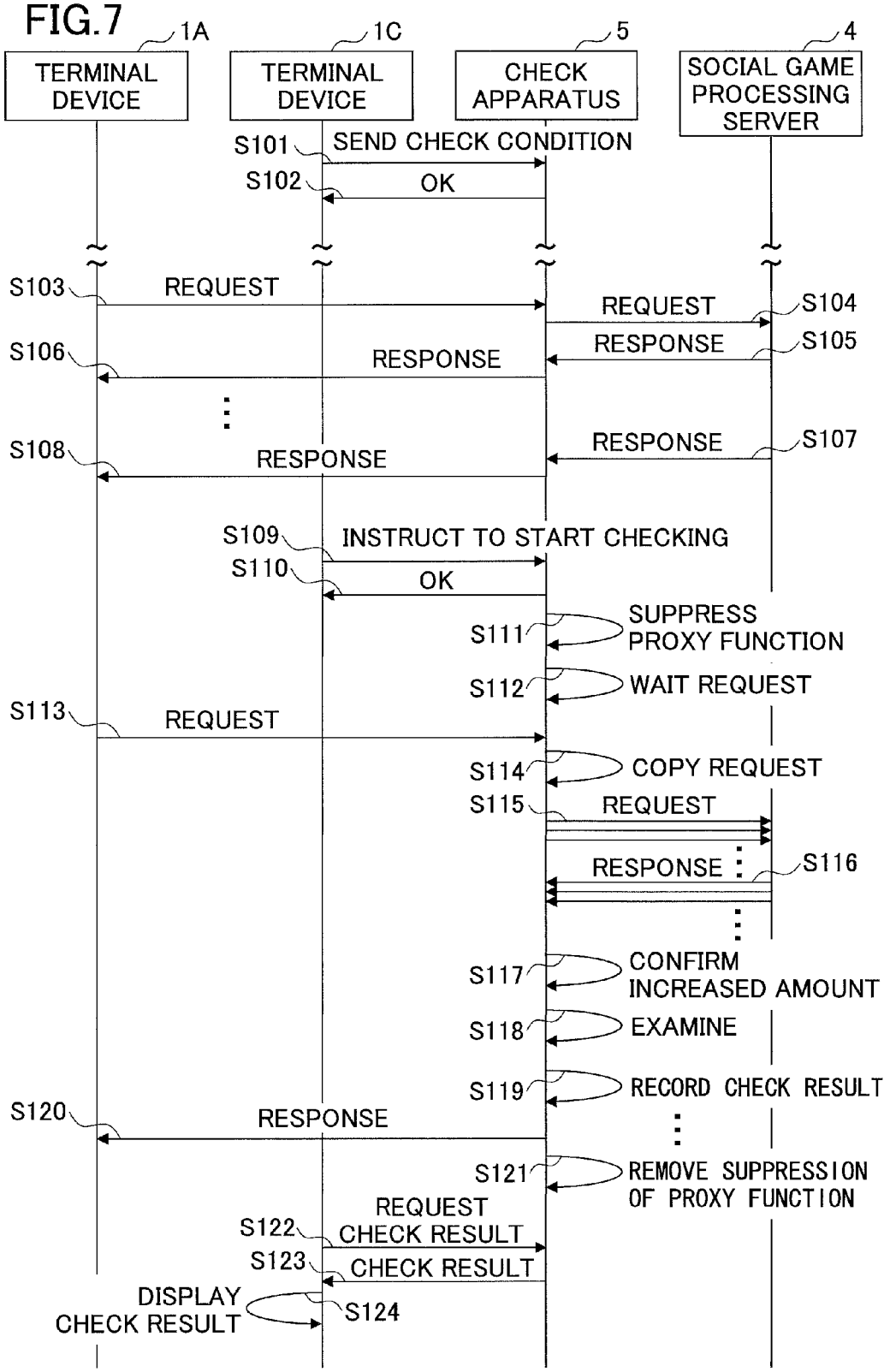
FIG. 7 is a sequence diagram illustrating an example of a process of the embodiment.

FIG. 7 is a sequence diagram illustrating an example of a process of the embodiment.

In FIG. 7, the check condition sending unit 151 of the terminal device 10 sends a check condition to the check apparatus 5 based on an operation of the operator (step S101). The setting receiving unit 52 of the check apparatus 5 receives the setting of the check condition and, upon appropriately processing the setting, sends a response indicating that the setting is appropriately performed to the terminal device 10 (step S102).

Figure 8:
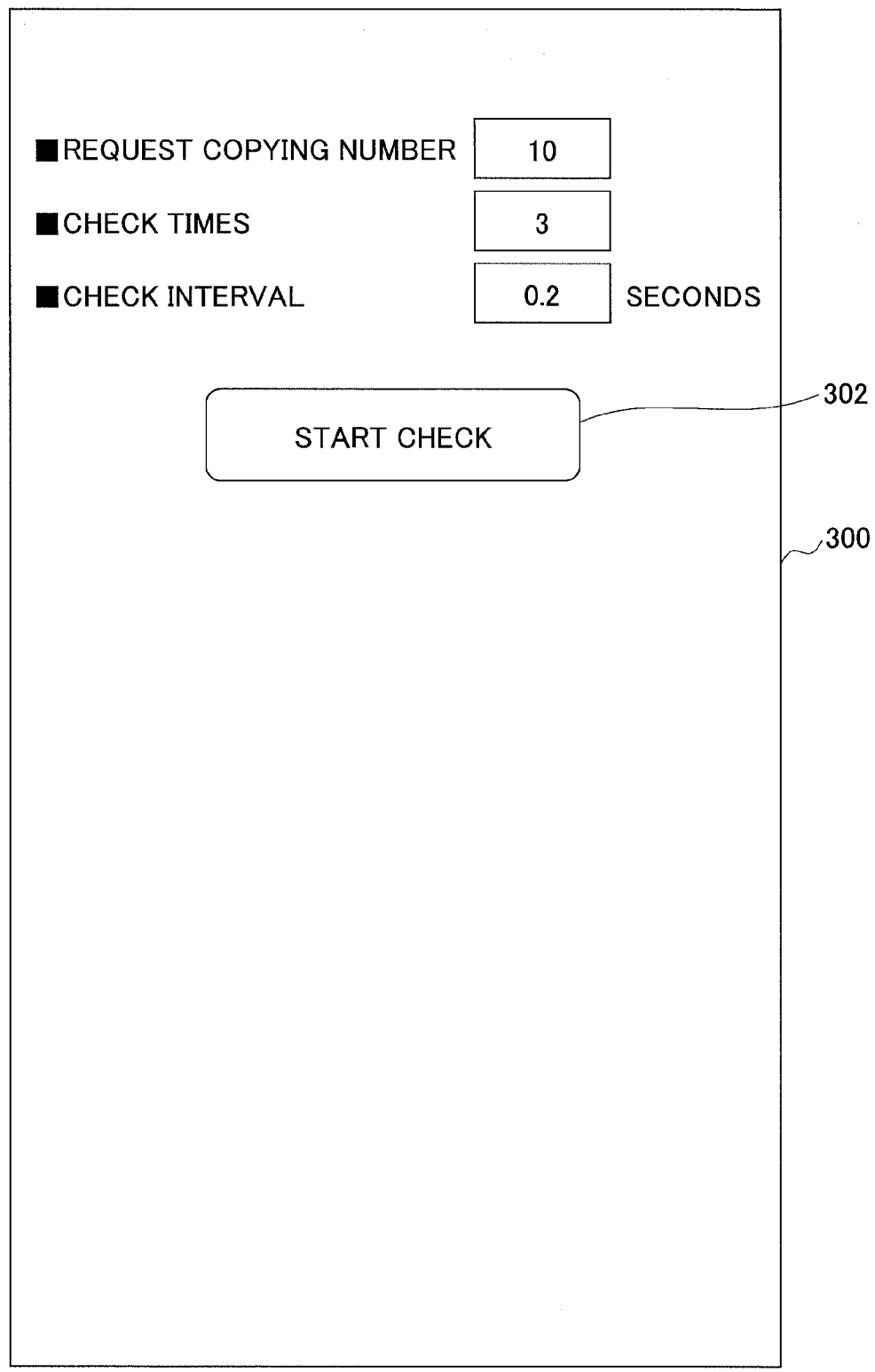
FIG. 8 is a view illustrating an example of an operation screen.

FIG. 8 illustrates an example of an operation screen 300 that is displayed at the terminal device 1C for setting the check condition. The operator can set the check condition by inputting or selecting the request copying number, the check times and the check interval. The operation screen 300 further includes a "start check" button 302 that is operated when instructing a start of the checking.

The check condition may be set before instructing to start the checking. Further, as the default values are set for the check condition, if there is no need to change the default values, it is unnecessary to set a new check condition.

Referring back to FIG. 7, based on an operation by the player (operator), the server accessing unit 13 of the terminal device 1A sends a request for a game progression to the check apparatus 5 that functions as the proxy server (step S103). Then, the proxy unit 51 of the check apparatus 5 transfers the received request to the social game control server 4 (step S104).

The request processing unit 41 of the social game control server 4 performs a process corresponding to the received request and sends a response to the check apparatus 5 (step S105). Then, the proxy unit 51 of the check apparatus 5 transfers the response to the terminal device 1A (step S106).

Here, it is assumed that a response is sent from the social game control server 4 to the terminal device 1A that indicates an item is capable of being provided in a course of the game progression (step S107, S108).

Figure 9:
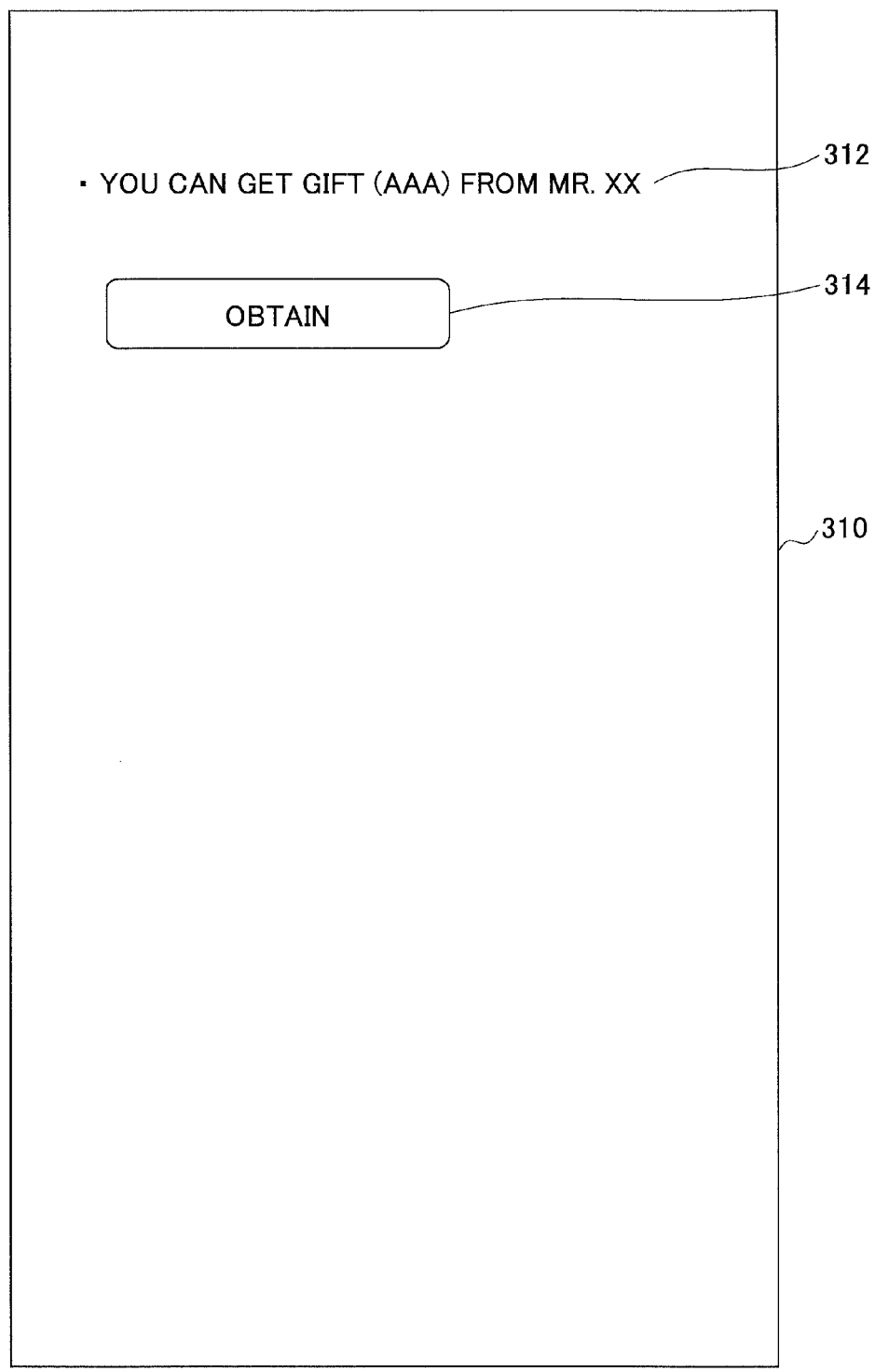
FIG. 9 is a view illustrating an example of a game screen.

FIG. 9 illustrates an example of a game screen 310 that is displayed when an item is gifted to the player from another player. In the game screen 310, a message 312 "You can get gift (AAA) from Mr. XX" and an "obtain" button 314 are included. This means that the player can obtain the gift when the player pushes the "obtain" button 314.

Referring back to FIG. 7, when the operator wants to check the social game control server 4 for the process of providing the item, the operator instructs to start the checking to the check apparatus 5 from the start instruction sending unit 152 of the terminal device 1C (step S109). For example, the checking is started when the "start check" button 302 in the operation screen 300 illustrated in FIG. 8 is pushed.

Referring back to FIG. 7, upon appropriately receiving the instruction to start the checking, the start instruction receiving unit 53 of the check apparatus 5 sends a response indicating that the instruction is appropriately received (step S110). Then, in the check executing unit 55 of the check apparatus 5, the proxy function suppressing unit 551 suppresses the proxy function (step S111) and the request waiting unit 552 starts to wait for a request (step S112).

Thereafter, when a request is issued in the terminal device 1A (for example, when a request corresponding to the "obtain" button 314 in the game screen 310 in FIG. 9 is issued), the request waiting unit 552 of the check apparatus 5 receives the request from the terminal device 1A (step S113).

Then, the request copying unit 553 copies the request to prepare the predetermined number of the requests (a group of requests corresponding to the request copying number for check times) in accordance with the check condition (step S114). Thereafter, the request sending unit 554 sends the group of requests to the social game control server 4 at the same time for each of the check times (step S115).

The request processing unit 41 of the social game control server 4 performs a process corresponding to the received request and sends a response to the check apparatus 5 (step S116). The response may be a response when the appropriate number of item(s) is appropriately provided, a response indicating an error against a fact that the item obtaining request is duplicated, a response when more inappropriate number of item(s) is wrongly provided due to a duplicated process, or the like.

Then, in the check executing unit 55 of the check apparatus 5, the item amount checking unit 555 confirms an increased amount of the item of the player at the social game control server 4 in accordance with the plurality of requests for each of the check times and determines whether a duplicated process occurs (step S117).

Then, the examining unit 556 examines the social game control server 4 based on a determined result of the duplicated process by the item amount checking unit 555, the check condition or the like (step S118).

Then, the check result storing unit 557 internally stores a check result such as whether a duplicated process occurs for each of the check times, logs of the actually sent requests and responses, an examined result by the examining unit 556 or the like (step S119).

Thereafter, the same operation is performed for the check times, and a response is sent to the terminal device 1A (step S120). At this time, as a single request is sent from the terminal device 1A, a single response is sent. Then, the proxy function suppressing unit 551 removes the suppression of the proxy function (step S121).

Thereafter, upon receiving a request of a check result from the terminal device 1C (step S122), the check result sending unit 56 of the check apparatus 5 responds the check result (step S123), and the terminal device 1C displays the check result (step S124). Here, although the check result is responded in response to the request from the terminal device 1C, the check result may be responded to the terminal device 1C without waiting for the request from the check apparatus 5.

Figure 10:
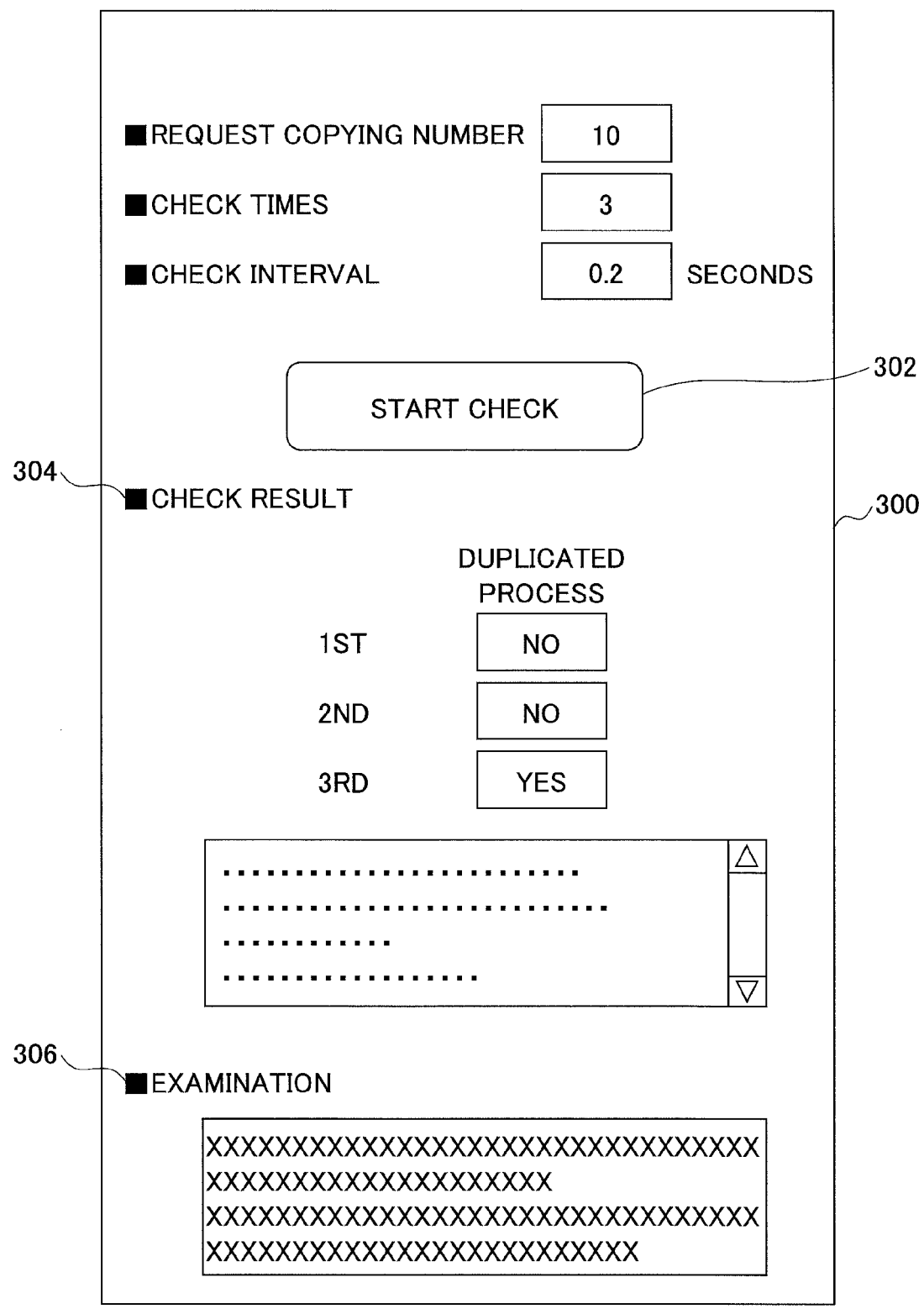
FIG. 10 is a view illustrating an example of an operation screen.

FIG. 10 illustrates an example of the operation screen 300 that is displayed at the terminal device 1C in which the check result 304 and a content of the examination 306 are displayed in addition to the check condition. In this example, it is indicated that, among three check times, a duplicated process does not occur for the first and the second check time and a duplicated process occurs for the third check time. Further logs that indicate contents of the request and the response can be displayed below the check result 304 by scrolling.

Further, as the content of the examination 306, a message such as "There is a problem in a database transaction management. It is necessary to perform an exclusive control by locking records so that another process is not performed at the same time when you perform an important process." Or the like is displayed. Alternatively, for the content of the examination 306, a message such as "There is a possibility that the check condition is insufficient. Please reset the settings to perform the checking again." or the like may be displayed.

The individual constituents of the terminal devices 1 (1A to 1C), the social game control server 4 and the check apparatus 5 may be embodied by arbitrary combinations of hardware and software, typified by a CPU of an arbitrary computer, a memory, a program loaded in the memory so as to embody the constituents illustrated in the drawings, a storage unit for storing the program such as a hard disk, and an interface for network connection. It may be understood by those skilled in the art that methods and devices for the embodiment allow various modifications.

As described above, according to the embodiment, a duplicated process that occurs when a plurality of requests are sent from a user terminal to the server at the same time or within a short period terminal device can be effectively checked.

Although a preferred embodiment of the server check system and the server check apparatus has been specifically illustrated and described, it is to be understood that minor modifications may be made therein without departing from the spirit and scope of the invention as defined by the claims.

The present invention is not limited to the specifically disclosed embodiments, and numerous variations and modifications may be made without departing from the spirit and scope of the present invention.

The present application is based on and claims the benefit of priority of Japanese Priority Application No. 2013-117004 filed on Jun. 3, 2013, the entire contents of which are hereby incorporated by reference.

What is claimed is:

1. A server check system including a processor and a memory that checks a duplicated process of a server that performs a predetermined process in response to a request from a terminal device, comprising:
    a receiving unit that receives a request sent from the terminal device to the server when starting a checking;
    a proxy function suppressing unit that suppresses the transferring of the request until the request is copied for a predetermined number to be sent at the same time by a proxy function after starting the checking;
    a sending unit that generates the predetermined number of requests by copying the request and sends the predetermined number of requests to the server at the same time by the proxy function; and
    a determining unit that obtains a processed result by the server based on the predetermined number of requests and determines whether a duplicated process occurs.

2. The server check system according to claim 1, wherein the determining unit determines whether the duplicated process occurs by obtaining the processed result by the server from data returned from the server as a response.

3. The server check system according to claim 1, wherein the determining unit determines whether the duplicated process occurs by accessing data at a predetermined address and obtaining the processed result by the server.

4. The server check system according to claim 1, further comprising:
    a setting receiving unit that receives a setting of a check condition including the predetermined number.

5. The server check system according to claim 1, further comprising:
    an examining unit that examines the server based on a determined result by the determining unit.

6. A server check apparatus including a processor and a memory that checks a duplicated process of a server that performs a predetermined process in response to a request from a terminal device, comprising:
    a receiving unit that receives a request sent from the terminal device to the server when starting a checking;

a proxy function suppressing unit that suppresses the transferring of the request until the request is copied for a predetermined number to be sent at the same time by a proxy function after starting the checking;

a sending unit that generates the predetermined number of requests by copying the request and sends the predetermined number of requests to the server at the same time by the proxy function; and a determining unit that obtains a processed result by the server based on the predetermined number of requests and determines whether a duplicated process occurs.

7. A non-transitory computer-readable recording medium having recorded thereon a program for a test apparatus that checks a duplicated process of a server that performs a predetermined process in response to a request from a terminal device to execute functions comprising:

a receiving function that receives a request sent from the terminal device to the server when starting a checking;

a proxy function suppressing unit that suppresses the transferring of the request until the request is copied for a predetermined number to be sent at the same time by a proxy function after starting the checking;

a sending function that generates the predetermined number of requests by copying the request and sends the predetermined number of requests to the server at the same time by the proxy function; and a check function that obtains a processed result by the server based on the predetermined number of requests and determines whether a duplicated process occurs.

* * * * *